United States Patent [19]
Blough et al.

[11] 3,778,233
[45] Dec. 11, 1973

[54] APPARATUS FOR LIQUID COMPOSTING

[75] Inventors: Ronald S. Blough; Robert D. Jones, both of Fairfield, Iowa

[73] Assignee: Fairfield Engineering and Manufacturing Co., Fairfield, Iowa

[22] Filed: Apr. 20, 1971

[21] Appl. No.: 135,597

[52] U.S. Cl............ 23/259.1, 71/9, 71/12, 71/14, 195/137, 261/DIG. 71, 261/121, 261/93, 261/124, 210/170, 210/195
[51] Int. Cl............................. C05f 3/06
[58] Field of Search............ 23/259.1; 71/9, 12, 71/14; 195/137; 261/85, 87, 93, 121, 124, DIG. 71; 210/170, 195

[56] References Cited
UNITED STATES PATENTS

| | | | |
|---|---|---|---|
| 3,614,072 | 10/1971 | Brodie | 261/93 |
| 3,516,545 | 6/1970 | Larkin | 210/195 |
| 1,616,655 | 2/1927 | Gilchrist | 261/87 X |

*Primary Examiner*—James H. Tayman, Jr.
*Attorney*—Wolfe, Hubbard, Leydig, Voit & Osann

[57] ABSTRACT

The apparatus generally comprises an elongated hollow shaft having a propeller secured to its lower end and driven at its upper end by a motor mounted on a swingable frame. Air may enter the upper end of the shaft and may exit adjacent the propeller. Rotation of the shaft and propeller thus induces air into the material. The shaft is immersed in the material at an angle to break the air into a multitude of fine bubbles while simultaneously moving the material around the reservoir.

8 Claims, 4 Drawing Figures

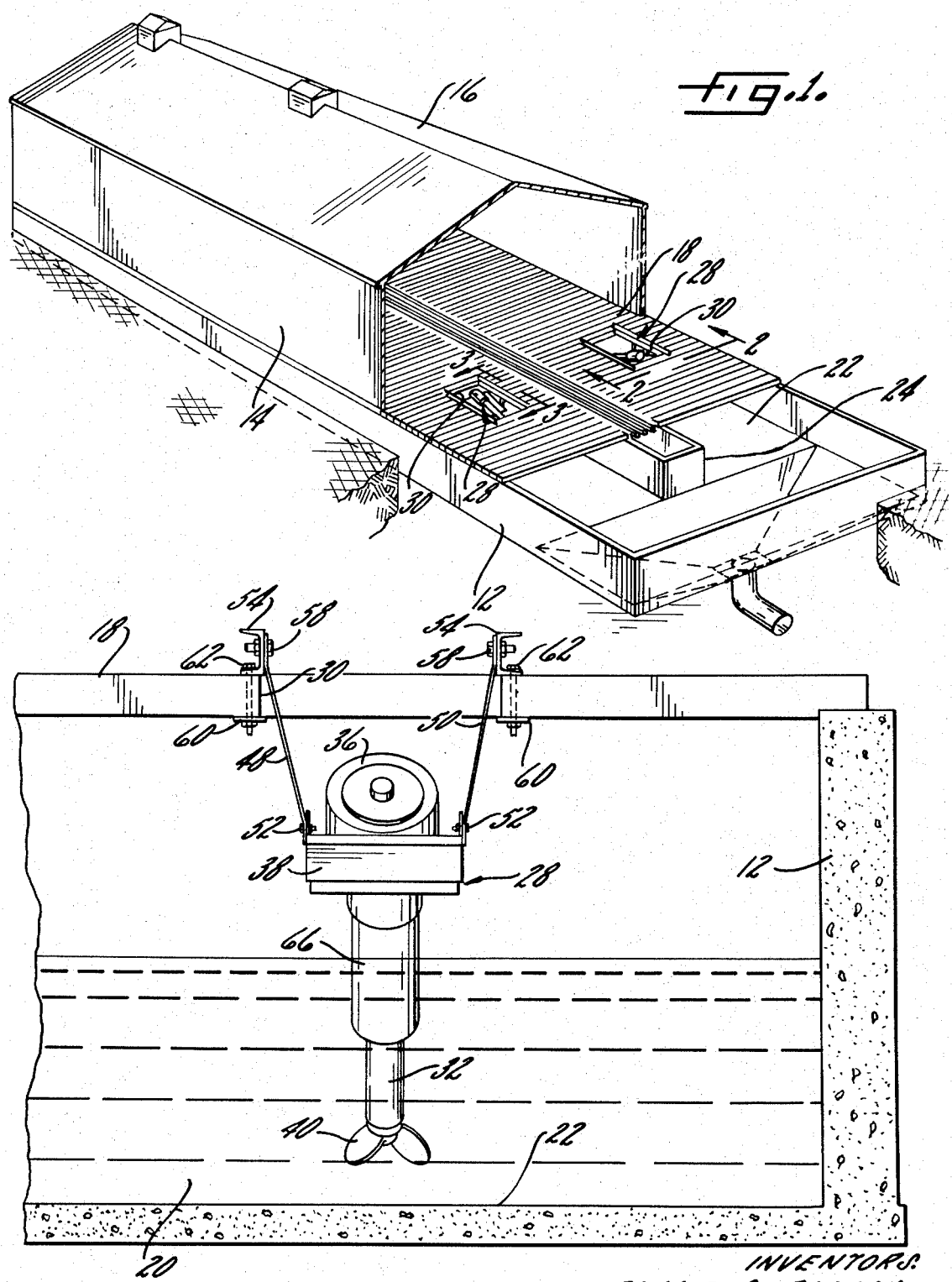

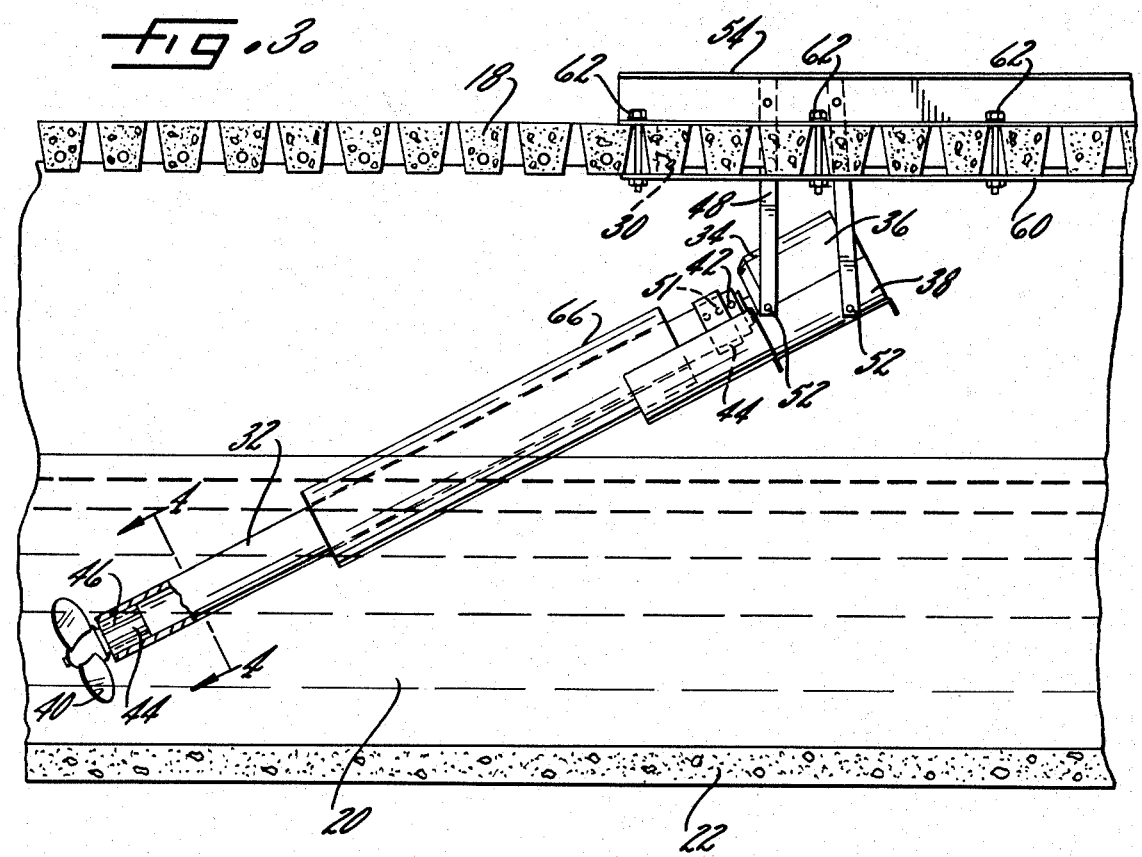
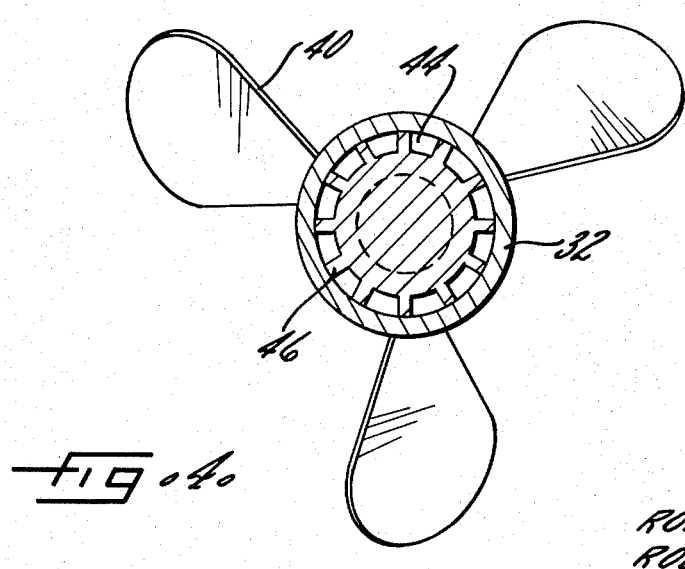

3,778,233

APPARATUS FOR LIQUID COMPOSTING

This invention relates generally to the liquid composting art and, more specifically, relates to apparatus for liquid composting animal waste material and to a method for such liquid composting.

Relatively recent research advances in the general area of sewage treatment and more particularly in the area of liquid composting has resulted in the realization that, under properly controlled conditions, animal wastes and the like may be broken down into components which may be used as fertilizer or may be disposed of without creating either a health hazard or a pollution problem. Bacterial breakdown of sewage waste material is essentially performed by one of two basic processes; namely, aerobic and anaerobic. The latter process does not require oxygen and is therefore the prevailing process by which bacterial breakdown occurs where any substantial accumulation of waste is present, such as in manure lagoons (used by farmers to a limited extent), septic tanks, hog houses and the like. While manure or animal waste will eventually breakdown and be oxidized, the anerobic process is accompanied by the production of noxious gases and has other disadvantages as well.

The aerobic process is performed by oxygen requiring aerobic bacteria and has numerous advantages over the anerobic process. For example, chemical breakdown is achieved by aerobic bacteria without the generation of objectionable odors. Moreover, the process does not attract flies or other vermin and the fertilizer value in the processed liquid is also retained. However, aerobic bacteria need a constant supply of oxygen on which to thrive and, therefore, such aerobic systems require continuous replenishment of dissolved oxygen consumed by the aerobes in the waste material. Additionally, agitation is necessary to prohibit waste particles from settling out and resisting bacterial decomposition.

These requirements of aerobic systems have given rise to numerous mechanical aerators and agitators, including designs similar to those used in commercial sewage treatment plants. For example, devices have been designed to aerate the material by rotating paddle wheels or the like which operate to either beat air into the material while moving it in the reservoir or to at least partially throw the material into the air. Other designs have incorporated separate means for moving the material in the reservoir and have introduced air by pumping compressed air through permeable "air stones" positioned at the bottom of the reservoir. The air stones are adapted to break the air into bubbles which enter the waste material. Bubbles are preferred over a stream of air passing through the material because the ratio of surface area to volume is greater and enables the oxygen to be more easily dissolved in the material. The proper functioning of an aerobic system is, of course, dependent upon the quantity of dissolved oxygen that is present within the waste material. It is seen that more power would be consumed by injecting larger than necessary quantities of oxygen into the material and, therefore, economic considerations are important in the manner in which oxygen is introduced. Another important economic consideration involves the manner in which the material is moved around or circulated within the reservoir.

The efficiency in which oxygen is dissolved in the material is improved through the use of the bubble producing air stones. However, air stones currently in use produce bubbles of about 100 millimeter diameter and only about 5 percent of the oxygen in the air is dissolved in the material. By decreasing the size of the bubbles, the ratio of surface area to the volume increases and this has been found to further increase the efficiency of dissolving oxygen in the material.

Accordingly, it is an object of the present invention to provide an apparatus for efficient and low cost liquid composting by a continuously circulating aerobic process.

A further object of the invention is to provide apparatus for use in an aerobic composting system which may be inexpensively manufactured and which requires minimum operational supervision.

Yet another object of the present invention is to provide apparatus for use in an aerobic process for liquid composting, which efficiently introduces air into animal waste material or the like, and which also efficiently moves the material in the reservoir in which it is located.

More specifically, it is an object of the present invention to provide apparatus that produces a multitude of extremely small air bubbles having a high ratio of surface area to volume and thus enables a high percentage of the oxygen to dissolve in the material.

Still another object of the invention is to provide apparatus of the above character that may easily be removed from the material for repair, replacement or periodic maintenance checking.

Other objects and advantages will become apparent from reading the ensuing specification and upon reference to the accompanying drawings, in which:

FIG. 1 is a perspective view of a livestock confinement house, partially in section, and incorporating the liquid composting apparatus of the present invention;

FIG. 2 is an end view of the apparatus of the present invention, and is taken generally in the direction of the line 2—2 of FIG. 1;

FIG. 3 is a side view of the apparatus of the present invention, partially in section, and is taken generally in the direction of the line 3—3 of FIG. 1; and, FIG. 4 is a sectional view of a portion of the apparatus of the present invention taken generally along the line 4—4 of FIG. 3.

While the invention has been described herein in connection with certain preferred embodiments it will be understood that the invention is not intended to be limited to those embodiments, but is intended to encompass all alternative and equivalent constructions as may be included within the spirit and scope of the invention as expressed in the appended claims.

Turning now to the drawings, and in particular to FIG. 1, the liquid composting apparatus of the present invention is shown in conjunction with a livestock confinement building having foundation walls 12, building walls 14, and a roof 16. The building is a relatively long structure compared to its width, which lends itself to efficient production methods of feeding and finishing livestock, such as pigs, for example.

The building may have a floor 18 fabricated from a plurality of concrete slats laid side by side as is clearly illustrated and described in copending application entitled LIVESTOCK CONFINEMENT HOUSE WITH IMPROVED ENVIRONMENTAL CONTROL, Ser. No. 59,654 filed July 30, 1970, now U.S. Pat. No. 3,677,229, which is assigned to the same assignee. As is disclosed therein, the slats are slightly spaced from one another defining slots through which animal waste may pass, which aids in keeping clean the area where the animals are confined —a consideration which is conducive to their health and rapid growth.

Beneath the building floor 18 is a reservoir 20 defined by the foundation walls 12, as well as a reservoir floor 22 which may be a concrete slab or any suitable material adapted to seal the reservoir from the underlying ground. Positioned centrally within the reservoir 20 is a rectangularly shaped barrier 24 which generally divides the length of the reservoir 20 into two sections of approximately equal width. The walls of the barrier 24 terminate a distance from each end of the reservoir 20, preferably so the distance between the barrier 24 and the end walls of the foundation is approximately equal to the width of each of the side sections of the reservoir 20. Thus, the barrier 24 and the foundation walls 12 define a generally horizontal flow path around which the animal waste material may be moved. It will also be noted that in the building shown in FIG. 1, a center walkway exists above the area defined by the rectangular barrier 24 and that the barrier walls also support the interior portion of the floor 18. In the event the walkway is dispensed with, it will be understood that the barrier 24 may be a single straight wall extending approximately the same longitudinal length as the barrier 24.

Pursuant to the present invention, apparatus 28 is provided for introducing air bubbles into the waste material and for moving the material around the horizontal flow path in the reservoir. As shown in FIGS. 1–3, two of the apparatus 28 are suspended through rectangular openings 30 in the building floor 18. The number of apparatus required for adequately replenishing oxygen in the waste material as well as for moving the material around the flow path is largely dependent upon factors such as the length of the flow path and its cross sectional dimensions. For the building shown in FIG. 1, having a flow path length of about 300 feet and a flow path width of about 8 feet, two apparatus are sufficient.

In accordance with an important aspect of the present invention, a hollow elongated shaft 32 is connected to the output shaft 34 of an electric motor 36 or the like which is conventionally mounted on a generally channel shaped frame 38. At the lower end of the shaft 30 is an axial thrust propeller 40. Thus, operation of the motor 36 rotates the shaft and propeller within the material to move it around the horizontal flow path within the reservoir 20.

In accordance with another aspect of the present invention, the apparatus is adapted to generate a multitude of small bubbles having a diameter of approximately 1 millimeter and therefore a high surface area to volume ratio which is conducive to efficient and rapid dissolving of the oxygen within the waste material. The generation of the small air bubbles is performed by the introduction of oxygen immediately adjacent the propeller which, due to its high angular velocity, effectively breaks the air into fine bubbles as it moves the material generally around the horizontal flow path.

To introduce the air adjacent the propeller, the shaft 32 is provided with one or more apertures 42 located near its upper end portion. In the present instance, the apertures 42 are approximately ⅜ inch diameter and are arranged in oppositely positioned longitudinally spaced pairs. A slidable frictionally held collar 44 is preferably located at the upper end portion of the shaft 32 for selectively closing the apertures and thereby controlling the amount of air entering the interior of the hollow shaft 32. By controlling the amount of air entering the shaft, the load on the propeller can be varied to optimize running conditions in terms of loading the particular motor used. If extensive amounts of oxygen are introduced near the propeller, the load on the motor would be reduced since the propeller would be moving less material and more air under such conditions.

The propeller has a serrated sleeve 44 (shown in FIGS. 3 and 4) having an outside diameter slightly smaller than the inside diameter of the shaft 32, enabling the sleeve to be force-fit into the shaft. The longitudinally extending serrations or ridges 46 of the sleeve 44 are generally equally spaced around the circumference of the sleeve, presenting passages that enable air to pass from the interior of the shaft 32 to the area immediately rearward of the propeller 40. Rotation of the shaft and propeller produces an area of reduced atmospheric pressure immediately rearward of the propeller and causes the air to be induced or sucked downwardly through the shaft and into the material. The action of the propeller thereafter breaks the air flow into a multitude of small bubbles having a diameter of approximately 1 millimeter.

In keeping with the invention, the shaft 32 is angularly positioned within the material for the purpose of directing the horizontal component of the force produced by the axial thrust propeller uniformly in the direction around the generally horizontal flow path. Although the angle of the shaft relative to the surface of the material may be varied within considerable limits, depending upon the length of the shaft 32, the depth to which it is immersed into the material, the size of the cross section of the path as well as the height of mounting of the channel frame 38, it is preferred that the angle of the shaft be within the range of about 20°–45°.

In keeping with the invention, the channel shaped frame 38, motor 36, hollow shaft 32 and propeller are suspended from structural supports positioned above the reservoir, such that they are swingable in a direction generally parallel to the flow path and in a manner that maintains the propeller at a substantially constant elevation above the bottom of the flow path. Thus, during start-up, load on the motor may be reduced by the swinging reaction of the apparatus acting in response to the action of the propeller. Additionally, a reduced voltage starter (not shown) for the motor may be provided to prevent excessive start-up currents.

To provide swinging movement of the frame, motor, shaft and propeller while keeping the propeller at a substantially constant elevation, and referring to FIGS. 2 and 3, pairs of support elements 48 and 50 are pivotally connected to the opposite sides of the channel shaped frame 38 by pins 52 or the like. The upper end of each of the elements is similarly pivotally connected to one of two channels 54 and 56 by pins or bolts 58. The elements 48 and 50 define the ends of a parallelogram linkage which is adapted to permit movement of the channel shaped frame 38 in a direction generally parallel to the horizontal component of the thrust produced by the propeller. The channels 56 rest upon the upper surface of the floor 18 and provide support for the apparatus. In the event the floor slat construction is used, steel members 60 suitably bolted to the channels 54 and 56 by bolts 62 may be required to support the individual slats that do not extend continually from the foundation wall 12 to the barrier 24.

In the illustrated embodiment, the propeller is preferably positioned relatively close to the bottom of the reservoir to prevent accumulation and sedimentation of the heavier particles of the animal waste material and to keep substantially all of the material moving around the flow path. The action of the propeller breaks up the material, as well as injects air into it and thus helps insure that uniform break down of the material is performed within the reservoir.

In accordance with another aspect of the present invention, a stationary stabilizing cylinder 66 is provided to neutralize any radial oscillation that may be caused by the combination of rotation of the shaft and the movement of material horizontally past the shaft and propeller. The cylinder 66 preferably concentrically surrounds the shaft and is attached to the channel shaped frame 38 by suitable conventional means. The cylinder 66 preferably extends into the material a substantial distance, but terminates a sufficient distance from the lower end of the shaft 32 to prohibit the rotating propeller from drawing air between the cylinder and the shaft into the material. The cylinder held to stabilize the rotating shaft because the shaft generates centrifugal forces in the material located between the shaft and cylinder and thereby tends to maintain the shaft substantially centered in the cylinder and substantially free from radial oscillating movements.

From the foregoing, it will be understood that an improved aerating apparatus has been shown and described herein which can be easily and economically manufactured. The apparatus has many unique features enabling low maintenance and low cost operation, due in part to its adjustability for optimum running efficiency. The capability of efficiently supplying air to the waste material as well as moving it around within the reservoir significantly contributes to its desirability. Additionally, it is easily removed from the reservoir for periodic maintenance, replacement or repair.

We claim:

1. Apparatus for aeration and circulation of animal waste material in a reservoir comprising, in combination:

a hollow elongated shaft extending partially into said material;

means at the upper end of said shaft for admitting air into the interior thereof;

an axial thrust propeller rigidly attached to the lower end of said shaft, the lower end of the shaft having a plurality of spaced passages to permit air to exit therefrom, said shaft and propeller being effective to draw air through said passages when said shaft and propeller are rotated;

structural means adapted to be positioned above said reservoir for supporting said apparatus with said shaft disposed at an angle relative to the surface of said material;

means for rotating said shaft and propeller to draw air into the upper end and out from said lower end of said shaft and to generate a multitude of small air bubbles adjacent thereto while propelling said material in said reservoir forwardly of said propeller; and means attached to said supporting structural means including a hollow stationary cylinder substantially concentrically surrounding said shaft and extending into said material substantially short of the end of said shaft such that said propeller fails to draw air between said shaft and said cylinder, said rotating shaft being operable to generate centrifugal forces in said material to maintain said shaft substantially centered in said cylinder and free from radial oscillating movements.

2. Apparatus as defined in claim 1 wherein said structural means includes elements supporting said shaft for relative rearward movement responsive to the forward thrust generated by said propeller.

3. Apparatus as defined in claim 2 wherein said support elements define a parallelogram linkage adapted to permit said relative rearward movement while maintaining said propeller at a substantially constant elevation within said reservoir.

4. Apparatus as defined in claim 1 wherein said propeller has a serrated sleeve engaging the interior of said shaft, said serrated sleeve permitting air to exit from the lower end of said shaft, while rigidly securing said propeller to said shaft.

5. The apparatus as defined in claim 1 including means for controlling a predetermined amount of air entering said shaft at the upper end portion thereof.

6. Apparatus as defined in claim 5 wherein said means for controlling said predetermined amount of air comprises a plurality of apertures in the upper end portion of said shaft and means for selectively covering said apertures.

7. Apparatus as defined in claim 1 wherein said angle is within the range of about 20°–45°.

8. Apparatus as defined in claim 1 wherein said means for rotating said shaft includes an electric motor having an output shaft and means fittingly engaging the upper end of said hollow elongated shaft such that said upper end is effectively sealed, said electric motor being mounted to said structural means.

* * * * *